Patented Dec. 20, 1932

1,891,891

UNITED STATES PATENT OFFICE

OSCAR V. D. LUFT, OF MOUNT LEBANON, AND CHRISTIAN J. SCHWINDT, OF PITTSBURGH, PENNSYLVANIA

GRANULAR ORGANIC MATERIAL

No Drawing.    Application filed November 10, 1931.    Serial No. 574,222.

This invention relates to granular organic material and to processes of preparing such material.

Many organic compounds, such as phthalic anhydride, anthraquinone, alpha-naphthol, beta-naphthol, p-nitraniline, naphthylamine, benzidine, tolidine and phthalimide present serious difficulties in packing and shipping by reason of the forms in which they normally appear when prepared by the usual methods of preparation and purification. Some of these compounds, such as phthalic anhydride, anthraquinone and beta-naphthol, are ordinarily prepared by sublimation processes and appear in the form of needle crystals which pack very loosely and require a very large package for a relatively small weight of material. Other compounds, such as alpha-naphthol, benzidine and the like are commonly sold in the form of a powder, obtained by grinding the solidified material. These powders are very dusty and raise irritating fumes when handled, since the materials are themselves irritating to membranes of the eyes and nose, and are often difficult to dissolve because they tend to lump together when first moistened and require considerable agitation and disintegration of the lumps to produce intimate contact with the solvent.

It has been proposed to facilitate the handling of these materials by melting them and solidifying the molten product on the surface of a rotating drum, thus producing flakes which are more compact to handle; but melting the entire output of product requires large melting tanks which must often be closed and steam jacketed, as well as expensive flaking machinery, and the expenditure of large amounts of heat which are entirely lost when the product is cooled on the surface of the drum.

The present invention is based on a new principle, namely, that of opposing the latent heat given off on solidification of a molten product to the latent heat of fusion taken up by the same product upon melting. According to this principle, only a small portion of the product need be melted to produce a granular, non-dusting product, and the heat absorbed is not wasted but is used in forming a bond between the solidifying molten material and the solid portion of the product. In this way products having a sharp melting point, and tending to solidify in the form of plates, leaflets or needles are coated with a slowly hardened, porous covering containing interwoven crystals having good mechanical strength with an entire absence of dust.

The invention is preferably carred out by coating a portion of the product, ranging from 60–90% of the whole, in the solid form and preferably in the form of powder, crystals, crushed or comminuted granules, or in the form of shreds with the remaining portion of the product in molten state. The solid portion of the product is preferably agitated during the addition of the molten portion, so that a uniform covering of melted product is obtained on the surface of, or uniformly distributed throughout the solid phase, and the surface tension of the liquid tends to form the product into smaller or large granules, depending upon the rate of solidification.

Many of the products above mentioned, and particularly phthalic anhydride, anthraquinone and phthalimide, have sharp melting points and it is difficult to prepare pellets or shot from these compounds by simple hardening of the molten material because they solidify upon such small temperature changes that large agitators having an enormous power consumption are necessary to agitate or disintegrate the mass when it becomes frozen. The principles of the present invention, however, are such that the product is at all times retained in the form of discrete particles which are easy to agitate. The formation of the product requires practically no temperature change, for the sensible heat of these products is so small in comparison with their heat of fusion that the heat given off on solidification of the molten product tends to partially melt the surfaces of the solid particles, and the resulting gradual hardening produces a cross lattice of crystals that give the final product an excellent mechanical strength. Moreover, the lattice structure of the bonding material contains a large number of pores, which are readily penetrated by solvents and produce a much faster dissolving product than those obtained by processes resulting in a glazed surface.

The invention is not dependent upon any specific type of apparatus, but on the contrary, any receptacle provided with means for introducing the molten material to the solid material, and preferably so constructed as to permit stirring, can be used. Excellent results have been obtained with ordinary grainers of the drum type, in which a rotating drum provided with a fixed fork is used to agitate the solid material while the liquid phase is applied in a thin stream or spray. Closed mixers of the drum type, in which mixing is obtained by baffles on the inner periphery of the drum, are also useful, and both types present the advantage that the material is protected from contact with the air and does not sublime or generate fumes. Apparatus in which the solid material is spread out in a thin layer and agitated by moving rakes during the application of the molten material can also be used, and in general any type of apparatus producing proper agitation can be used to produce the novel products of the present invention.

The invention will be further described in connection with the following specific examples, but it is understood that these are for illustrative purposes only. The invention is not limited to any definite compound or series of compounds, but represents a perfectly general method of obtaining solid organic materials in a new and advantageous form.

*Example 1*

Small particles of phthalic anhydride obtained from the catalytic oxidation of naphthalene, such as the comminuted crystalline phthalic anhydride described in Patent No. 1,789,967 to Daniels and Schwindt, and which form dust upon packing or shipping is fed into a rotary drum either continuously or in batches and is coated with 20–40% of its weight of molten phthalic anhydride. The coating is preferably effected by pouring a thin stream of the molten material over the phthalic anhydride granules, which are continuously agitated by rotation of the drum and by stationary forks or other stirring means such as those provided in an ordinary grainer. No special heating or cooling means are necessary, since the latent heat which the molten phthalic anhydride gives off on solidifying is taken up by melting the surfaces of the solid particles so that the entire product solidifies without drastic cooling. The product leaving the rotating drum may be run to storage or may be brought into contact with cooling surfaces if desired in order to lower the temperature more rapidly. The product so obtained is screened to a uniform size, or may be first passed between rolls spaced to give the desired granulation size and then screened. The product appears in the form of granules having an irregular surface containing many pores, and does not dust when handled or shipped.

If a product having a glazed surface is desired, the rolls may be heated and revolved at different speeds so that the surfaces of the granules are flattened and polished, but as a rule this treatment is undesirable since the porous surface of the granule is a distinct aid to solution.

*Example 2*

Phthalic anhydride dust, such as that obtained by sifting flaked phthalic anhydride or by chipping and grinding a solidified product, are fed into a receptacle provided with agitators such as an ordinary dough mixer and coated with 25–50% by weight of molten phthalic anhydride. The product forms into granules without difficulty, and shows excellent mechanical strength against dusting or crushing during shipment. An examination of the granules shows that they consist of fine particles which are homogeneously cemented together by the crystal lattice produced by the solidified phthalic anhydride and contain many pores which permit ready penetration of solvents.

*Example 3*

Purified phthalic anhydride is obtained by catalytically oxidizing naphthalene with air in the vapor phase in the presence of a vanadium catalyst, condensing out phthalic anhydride and heating and distilling off the phthalic anhydride so obtained, with or without the use of a fractionating column. The product is run off into molds and cooled, after which it is chipped or shredded by a chipping machine. The shreds so obtained, with or without further grinding, are run into a rotary drum provided with baffles on its interior periphery and agitated while 20–45% of its weight of molten phthalic anhydride, which can be directly obtained from the still, is poured or sprayed over it. The product is obtained in the form of granules of larger or smaller size, depending on the size of the shreds or flakes used, the rapidity of agitation, and the percentage of molten phthalic anhydride applied.

*Example 4*

Phthalic anhydride, either that obtained by distilling a converter product from the catalytic oxidation of naphthalene or from a sublimation purification of such product involving vaporization with air and fractional condensation, is melted and applied to the surface of a water cooled rotating drum. A scraper on the opposite side of the drum removes the phthalic anhydride in the form of flakes, which contain considerable amounts of dust. The flakes, with or without the removal of all or a portion of the dust are passed into a rotating drum as in previous examples and coated with 15–40% of their weight of molten phthalic anhydride, whereby a granular product having a porous surface and excellent dissolving properties is obtained. By this process the glazed surface characteristic of the phthalic anhydride flakes is removed by the partial melting which occurs when the molten material is applied, and a uniform and porous product is obtained which shows no tendency to crush or dust upon packing or shipping and is readily dissolved in the usual solvents for phthalic anhydride.

*Example 5*

Powdered beta-naphthol, which is usually obtained by grinding the solidified product, is fed into a rotary drum and coated with 20–45% of its weight of molten beta-naphthol. The product forms into granules of larger or smaller sizes, depending on the amount of material retained in the drum and its speed of rotation, and may be directly packed or broken to size by passing through rollers following by screening if desired.

*Example 6*

Pure or semi-purified anthraquinone, such as that obtained by the sublimation and fractional condensation purification of a converter product from the catalytic oxidation of anthracene, is coated with 15–45% of its weight of molten anthraquinone. The coating is preferably carried out in a closed receptacle and elevated temperatures such as 75–150° C. may be used if desired, although the success of the process is not dependent upon them and a similar product may be produced by operating at atmospheric temperatures. The solidification of the molten anthraquinone upon the solid crystals produces an interwoven mass of crystalline material which has excellent mechanical strength and does not tend to lose weight in handling or shipping. The product may be crushed and screened to size or may be directly used in the usual solvents as a raw material for the production of alizarin or other anthraquinone dyestuffs.

The product is also excellently suited for processes involving a ground or comminuted material, since it can be crushed and ground with much less dust formation than can the original anthraquinone crystals.

*Example 7*

Pure or impure phthalimide, such as that obtained by evaporating ammonium phthalate to dryness, is coated with 10–40% of its weight of molten phthalimide as described in previous examples, and upon hardening is obtained in the form of granules having an irregular surface. This product is well suited for shipping and for solution in such chemicals as are commonly used in transforming it into anthranilic acid or into N-substituted phthalimides.

In similar manner the principles of the invention may be applied to hydrocarbons and substituted hydrocarbons such as p-nitrotoluene, p-dichlorbenzene, m-dinitrobenzene and the like; amines such as alpha-naphthylamine; derivatives of amino compounds such as di-anisidine; guanidines such as di- and triphenyl guanidine, salts of organic acids such as anhydrous sodium acetate and in general to almost any organic compound that can be melted without decomposition.

What is claimed as new is:

1. A process of preparing organic material in granular form, which comprises hardening a film of molten organic material upon the surfaces of further amounts of the same material in solid form.

2. A process of preparing crystalline organic material in granular form, which comprises hardening a coating of molten material upon the surfaces of solid crystals of the same material.

3. A process of producing organic material in granular form, which comprises agitating solid particles of said material and simultaneously applying further amounts of the same material in molten form, whereby the heat given off on solidification of the molten material is taken up by the solid particles to produce a slowly hardened covering.

4. A process of preparing crystalline organic material in granular form, which comprises agitating solid particles of the crystalline material and simultaneously adding further amounts of the same material in molten form, whereby the heat given off on solidification of the molten product is taken up by the solid product to produce a slowly hardened covering containing interwoven crystals.

5. A process according to claim 3, in which the amount of molten material is from 15 to 40% of the weight of the entire mass.

6. A process according to claim 4, in which the amount of molten material is from 20 to 40% of the weight of the entire mass.

7. A process of preparing an organic acid compound in granular form, which comprises agitating a body of solid particles of said material and simultaneously applying further amounts of the same material in molten form, whereby the heat given off on solidification of the molten material is taken up by the solid particles to produce a slowly hardened covering.

8. A process of preparing phthalic anhydride in granular form, which comprises agitating a body of solid particles of said material and simultaneously applying further amounts of the same material in molten form, whereby the heat given off on solidification of the molten material is taken up by the solid particles to produce a slowly hardened covering.

9. A process of preparing non-dusting granules of phthalic anhydride from phthalic anhydride crystals, which comprises breaking the crystals into small pieces, and coating them with molten phthalic anhydride.

10. A process of preparing non-dusting granules of phthalic anhydride from phthalic anhydride crystals, which comprises breaking the crystals into small pieces, agitating these pieces, and simultaneously adding further amounts of phthalic anhydride in molten form, whereby the heat given off on solidification of the molten phthalic anhydride is taken up by the solid particles to produce a slowly hardened, porous covering containing interwoven crystals.

11. A process according to claim 10, in which the molten phthalic anhydride is added in amounts of from 20 to 40% of the entire mass.

12. A method of preparing phthalic anhydride in granular form, which comprises agitating a body of phthalic anhydride dust, simultaneously adding molten phthalic anhydride to the mass, and continuing the agitation until the product has solidified into grains.

13. A process according to claim 12, in which the molten phthalic anhydride is added in amounts from 25 to 50% of the entire mass.

14. A process of preparing phthalic anhydride in granular form, which comprises agitating flakes of phthalic anhydride and simultaneously adding further amounts of phthalic anhydride in molten form, the agitation being continued until the mass has formed into granules.

15. A process of producing phthalic anhydride in granular form, which comprises shredding solidified masses of phthalic anhydride, agitating the shreds, and simultaneously applying further amounts of phthalic anhydride in molten form, the agitation being continued until the mass has formed into granules.

16. As a new product, an organic compound in the form of granules having a hard, porous outer coating produced by solidifying a liquid coating of the compound upon the surface of an originally solid nucleus.

17. As a new product, phthalic anhydride in the form of granules having an unglazed, porous surface.

18. As a new product, phthalic anhydride in the form of granules having an unglazed, porous surface containing interwoven crystals.

19. As a new product, a package of granular phthalic anhydride characterized by a substantial absence from dust.

20. As a new product, granules of phthalic anhydride having an inner nucleus of solid phthalic anhydride in a form capable of producing dust surrounded by an outer coating of phthalic anhydride in a form incapable of producing dust.

Signed at Pittsburgh, Pennsylvania, this 29th day of October, 1931.

OSCAR V. D. LUFT.
CHRISTIAN J. SCHWINDT.